(12) United States Patent
Ovnicek et al.

(10) Patent No.: US 8,413,731 B2
(45) Date of Patent: Apr. 9, 2013

(54) APPARATUS AND METHOD FOR DIAGNOSTIC LEVERAGE TESTING OF EQUINE DISTAL LIMB

(76) Inventors: Eugene D. Ovnicek, Penrose, CO (US); Brady L. Hanna, Penrose, CO (US)

( * ) Notice: Subject to any disclaimer, the term of this patent is extended or adjusted under 35 U.S.C. 154(b) by 659 days.

(21) Appl. No.: 12/652,868

(22) Filed: Jan. 6, 2010

(65) Prior Publication Data

US 2010/0179388 A1 Jul. 15, 2010

Related U.S. Application Data

(60) Provisional application No. 61/143,482, filed on Jan. 9, 2009.

(51) Int. Cl.
*A01L 15/00* (2006.01)

(52) U.S. Cl. .................. 168/10; 33/195; 168/4

(58) Field of Classification Search ............... 168/4, 6, 168/10, 12, 45, 47; 73/172; 33/195; 36/155, 36/159, 160
See application file for complete search history.

(56) References Cited

U.S. PATENT DOCUMENTS

| | | | | | |
|---|---|---|---|---|---|
| 4,227,311 | A | * | 10/1980 | Behney | 33/195 |
| 7,596,875 | B2 | * | 10/2009 | Ross | 33/195 |

* cited by examiner

*Primary Examiner* — Rob Swiatek
*Assistant Examiner* — Danielle Clerkley
(74) *Attorney, Agent, or Firm* — Richard W. Hanes; Hanes and Bertels, LLC.

(57) ABSTRACT

The present invention includes a method and apparatus for diagnosing equine hoof and leg pathology. With the hoof to be diagnosed on the ground and in a load bearing position, sectors of the hoof are sequentially raised by application of a wedge to the bottom of the hoof where the wedge extends radially beneath the sector from the center of the hoof. Elevating a first sector of the foot stretches and adds tension to the connective tissue in the region diagonal to the sector that is elevated. At the same time, the joint surface and connective tissue in the region above the raised sector will be compressed during the elevating process. Following observation and measurement of the horse's response to the raising of the first sector, the foot sector diagonally opposite to the first sector is similarly raised and the horse's response is observed and measured. The discomfort or relief that is observed offers specific guidelines for diagnosis and treatment. The process is repeated for a plurality of sectors of the hoof.

7 Claims, 4 Drawing Sheets

APPARATUS AND METHOD FOR DIAGNOSTIC LEVERAGE TESTING OF EQUINE DISTAL LIMB

CROSS REFERENCE

This application claims the benefit of U.S. Provisional Application Ser. No. 61/143,482 filed on Jan. 9, 2009.

FIELD OF THE INVENTION

The present invention pertains to apparatus and method for diagnostic testing for equine hoof and leg pathology.

BACKGROUND OF THE INVENTION

Diagnosing and treating lower limb lameness in horses has improved significantly in the last 25 years with advancements in diagnostic equipment that now provides clear images of both hard and soft tissue. Digital Radiographs, sonograms, and MRI technologies are the tools commonly used in diagnosing the causes of lameness and associated physiological changes or anomalies. Notwithstanding the availability of these technologies, the procedures for diagnosing lameness in a horse are very time consuming and therefore expensive. Diagnostic nerve blocks are commonly used to locate a region of pain and once the general area of pain is located, the MRI, ultrasound, and radiograph technologies may be used to assist in completing the diagnosis and planning treatment. However, even after such expansive testing there is often speculation as to the exact structures that may be affecting the condition. There is no way of knowing if physiological changes or anomalies seen through the various diagnostic results are the actual cause of the lameness or are merely non-painful chronic lesions. Accordingly, it is difficult to prescribe treatment for a lameness that is assumed in a general area with no assurance that the clinical findings are acute or chronic at the time of the exam.

Treatment prescriptions for these lameness issues vary considerably from one practitioner to another. The inconsistencies in prescriptions and the results of treatment are largely due to the fact that the foregoing mentioned diagnostic methods and equipment cannot satisfactorily measure or quantify pain.

Accordingly, it is the primary object of the present invention to provide a method for precisely locating the affected structures of the hoof or leg of a horse exhibiting lameness or similar pathology and to improve the ability to pin point a diagnosis and prescribe appropriate treatment.

It is also an object of the present invention to provide a method which can localize pain in a particular physiological structure of a horse's hoof or leg.

A further object of the invention is to provide apparatus that will implement the novel diagnostic method disclosed.

Other and further objects, features and advantages of the invention will become apparent on a reading of the following descriptions of the invention, taken in conjunction with the attached drawings.

SUMMARY OF THE INVENTION

By utilizing the method of the present invention, pain can be identified and localized in all aspects of the joints of the distal limb of a horse. This is accomplished by sequentially raising one of eight sectors of the horse's foot at a time and making observations as to the horse's response to each. Significantly elevating a first sector of the foot will stretch and add tension to the connective tissue in the region diagonal to the sector that is raised. At the same time, the joint surface and connective tissue in the region above the raised first sector will be compressed during the elevating process. Following observation and measurement of the horse's response to the raising of the first sector, the foot sector diagonally opposite to the first sector is similarly raised and the horse's response is observed and measured. The discomfort or relief that is observed offers specific guidelines for diagnosis and treatment. The process is repeated for all sectors of the hoof. For example, heel to toe, right heel quadrant to left toe quadrant, left side to right side and right toe quadrant to left heel quadrant.

The preferred apparatus for implementing the diagnostic method comprises a flat plate configured for temporary application to the ground contacting surface of a horse's hoof which plate has a plurality of angularly spaced apart grooves radially extending from a center point on the plate. A generally triangularly shaped wedge member is pivotally connected to the center of the plate at the thin part of the wedge and extends radially across the bottom surface of the plate. A longitudinal rib is disposed on the base side of the triangular wedge which is sized and shaped to fit within the grooves of the plate that act as locating detents to centrally position the wedge under the sector of the plate in which the grooves are located. Attached to the plate are two elastic straps for encircling the hoof and thereby holding the plate and wedge to the sole of the horse's hoof. With the plate attached to the hoof on which the horse is standing the wedge acts to elevate the specific sector of the hoof that is above the wedge.

DETAILED DESCRIPTION

An understanding of the preferred form of apparatus for practicing the method of the present invention will facilitate an understanding of the subsequent description of the novel diagnostic method of the present invention.

Figure 1:
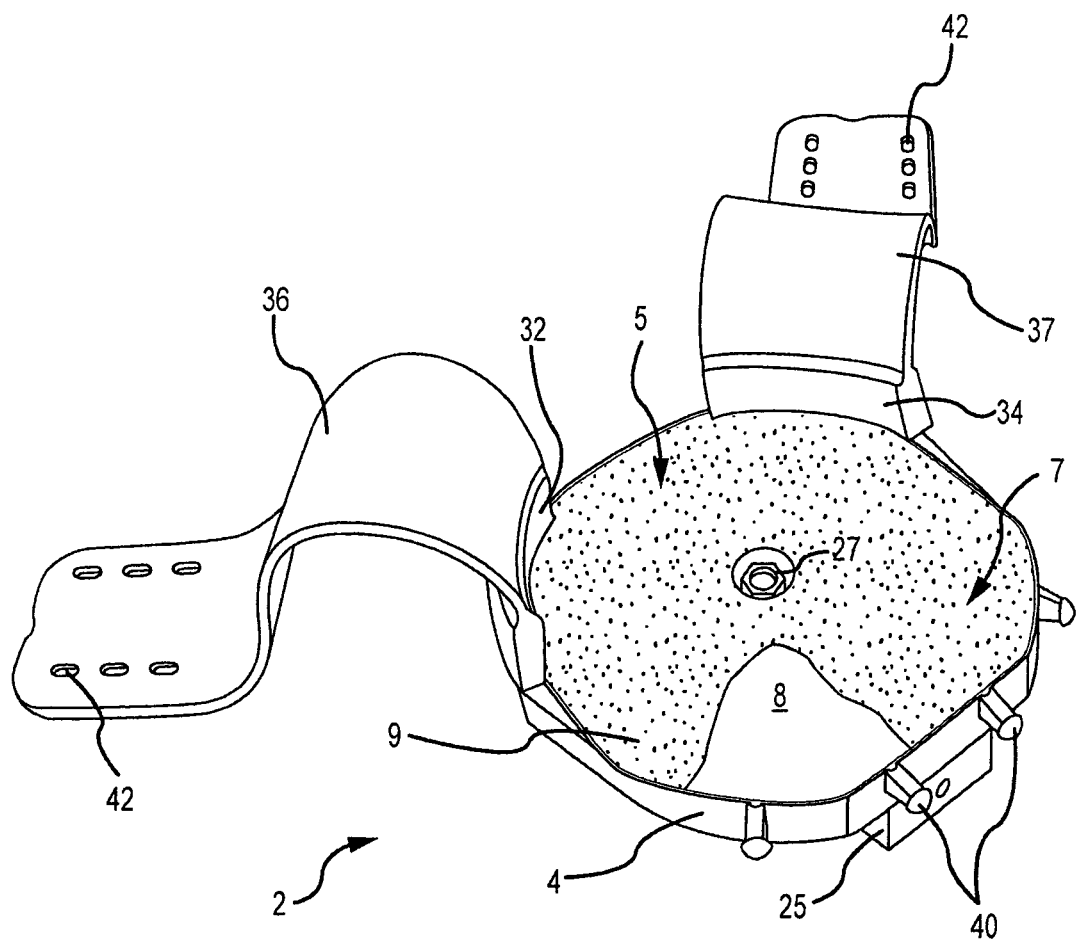
FIG. 1 is an upper perspective view of the plate and attaching straps of the leveraging apparatus of the present invention.
Figure 2:
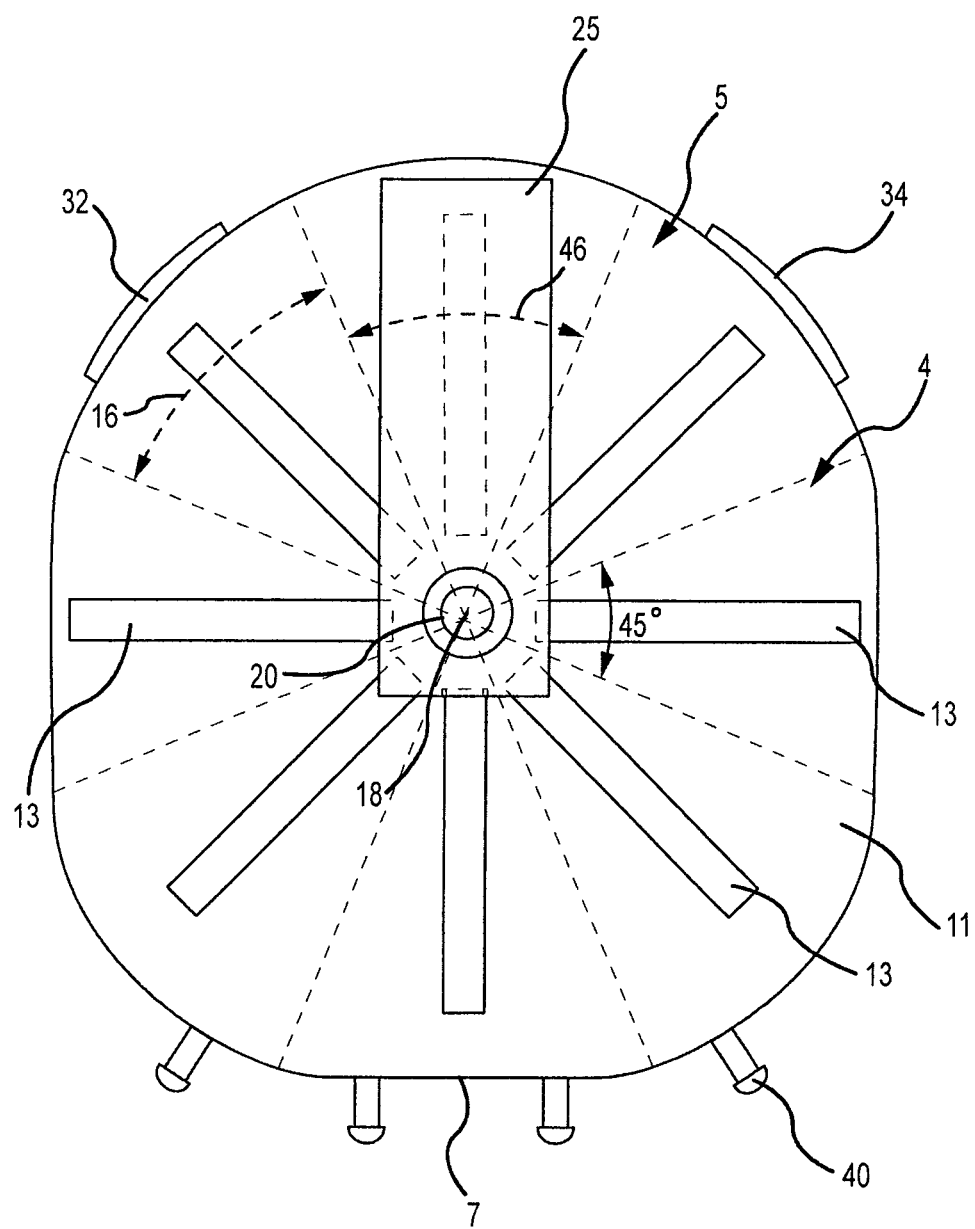
FIG. 2 is a bottom view of the plate of the leveraging apparatus with the rotatable wedge that is pivotally attached to the bottom of the plate being positioned in the toe sector of the plate.
Figure 3:
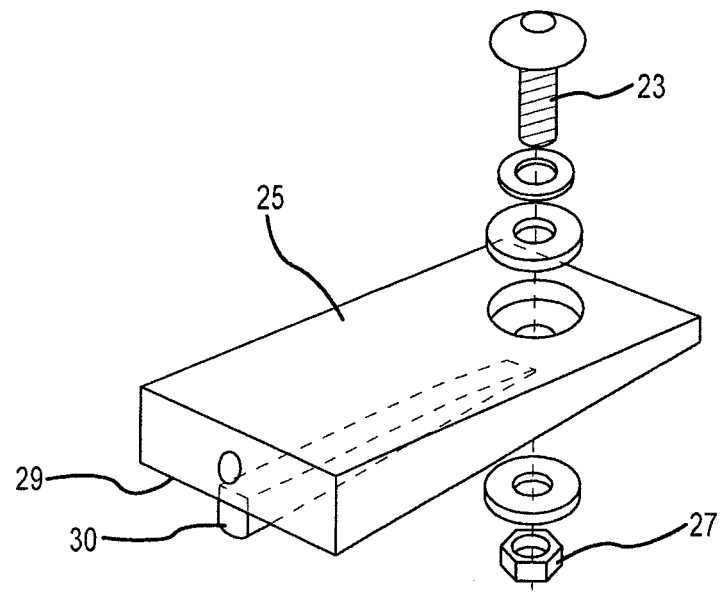
FIG. 3 is a perspective view of the generally triangularly shaped wedge that is pivotally attached to the bottom surface of the plate.

The leveraging device 2 of the present invention comprises a flat plate 4 shaped to be generally congruent with the bottom profile of a horse's hoof 3 and comprising a toe portion 5 and a heel portion 7. The top surface 8 of the plate 4 is adapted to be attached to the sole of the horse's hoof during the leveraging testing process. An abrasively surfaced pad 9 may be applied to the top surface 8 of the plate in order to reduce slippage between the plate and the perimeter of the horse's hoof that contacts the plate. The underside or bottom surface 11 of the plate is provided with a series of angularly related grooves 13 that extend radially outwardly from the center of the plate at 45 degree angles to each other. The boundaries of the designated sectors 16 of the plate 4 are shown in dotted lines in FIG. 2. Each of the grooves 13 represents the center of one of eight sectors of a substantially circular horse hoof whose center 18 is the central part of the bottom of the plate 4. Having eight sectors and eight grooves is preferable for detailed diagnosis; however the leveraging device could have fewer than eight, for example four sectors and four grooves. An aperture 20 located at the center of the generally circular plate 4 traverses the plate and is adapted to carry a bolt 23 (FIG. 3) that pivotally secures a wedge shaped member 25 to the bottom of the plate. A nut 27 engages the threads of the bolt 23 on the top side of the plate and when tightened serves to pivotally mount the wedge member 25 to the bottom surface 11 of the plate 4.

The wedge 25 is in the general form of a right triangle, the base side 29 of which is provided with a protruding longitudinal rib 30 that is sized and shaped to fit within the grooves 13 when the base side 29 of the wedge is flush with the bottom side 11 of the plate 4.

Figure 4:
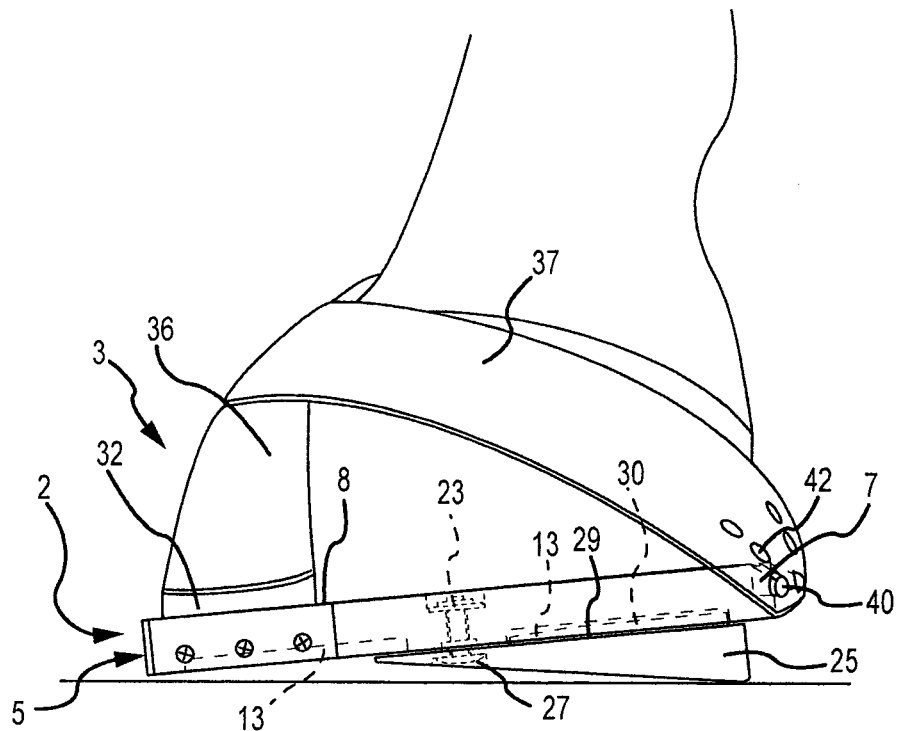
FIG. 4 is a side view of the leveraging apparatus when applied to a horse's hoof and where the radial wedge is positioned beneath the heel sector of the hoof.
Figure 5:
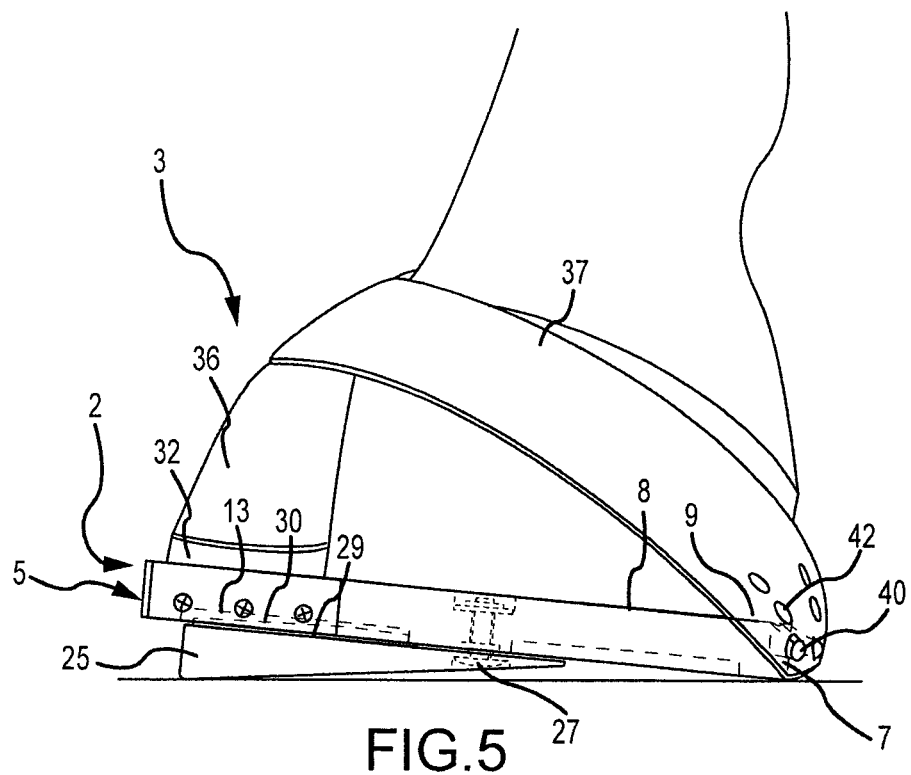
FIG. 5 is a side view of the leveraging apparatus when applied to a horse's hoof and where the radial wedge is positioned beneath the toe sector of the hoof which is diagonally opposite the heel sector, as shown in FIG. 3.

A pair of rigid stabilizing stops 32 and 34 is attached to the toe quarters of the plate. The stops assist in holding the hoof in place on the plate 4 while it is tilted during the leverage testing process, as shown in FIG. 4. In addition to the stops, flexible straps 36 and 37 are attached at their proximal ends to each of stops respectively and are adapted to wrap around the back of the hoof 3 and be secured at their distal ends by inserting pegs 40 that protrude from the heel portion 7 of the plate into selected ones of spaced apart holes 42 in the distal end of the straps.

In operation, the wedge member 25 may be moved from one of the angular positions (sectors 16) to another angular position by urging the wedge rib 30 out of the groove 13 in which it is located and rotating it to another groove. Each of the grooves acts as a detent for the rib in order to assure that the wedge is properly positioned in the correct sector and will accomplish leverage at the chosen position on the hoof.

While the leverage testing process of the present invention can be practiced with other apparatus, the method will be described in conjunction with the preferred form of leveraging device 2 described above.

Raising the hoof opposite the lame one being tested is a preferred first step in the process. This step establishes a baseline reaction of the horse prior to application of the leveraging device 2 to the lame hoof. For example, if the right front foot is lame and requires diagnosis one of the testing personnel will pick up the left front foot to determine the comfort level of the horse while standing primarily on the lame right front foot. Along with a determination of the comfort displayed by weight bearing on the right front foot, a judgment is made as to how easily or compliant the horse is to having its feet picked up in general. The non-testing foot should be picked up two to three times in order to determine the average response from the horse.

Figure 6:
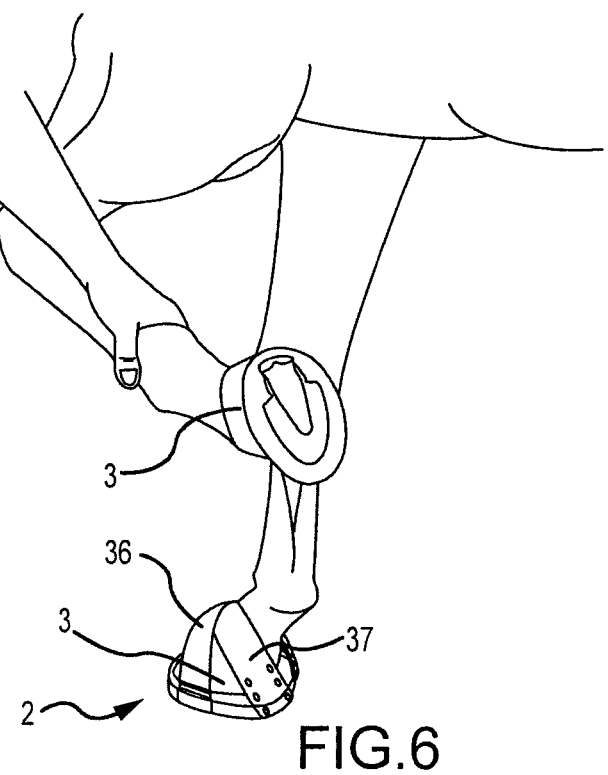
FIG. 6 is a perspective view of a farrier lifting the left front foot of a horse while the leveraging apparatus is attached to the sole of the right front foot, illustrating one step of the preferred diagnostic method of the present invention.

After establishing a baseline response from the horse to having his non tested foot picked up with full weight on the lame foot, the leveraging device 2 is applied to the hoof being tested. Once the horse has become used to the leveraging device attached to its foot the evaluation can begin. The wedge 25 is positioned in one sector, for example, the toe sector 46 which is the 12:00 o'clock position of the plate (see FIG. 2). With the horse standing on the leveraging device (assuming for illustrative purposes that the right front foot is being tested), the horse's left front foot is picked up in a manner similar to the technique employed in establishing a baseline response. The left front foot is held in the picked up position, as shown in FIG. 6, for two to three seconds during which an observation is made as to how easily the horse picked up the foot and how willing the horse is to hold the foot up or how urgent the horse is to put the foot back down. After the left foot is placed back on the ground an evaluation is made as to how quickly and to what extent the horse loads the foot that was just placed back on the ground and how quickly and to what extent the horse unloads the foot having the leveraging device attached to it. Preferably, this step of the process will be repeated several times in order to determine a final "grade" from the evaluation of the horse's responses and to discount any response due to the horse's apprehension of the process. In general, when elevation (the wedge 25) is placed under one region of the foot and a positive pain response is seen, a negative pain, or pain relief response is likely to be seen when the wedge is repositioned to a region of the foot that is opposite to the one responsible for the pain response.

Determining the final "grade" may be assisted by reference to the following chart:

| -1 | -2 | -3 |
|---|---|---|
| Mild Dislike Will Pick Up Other Foot But Will Not Hold it Up For Long. Unloads Other Foot Faster Than The Base Line. | Moderate Dislike Will Pick Up Other Foot with Hesitation, But Anxious to Put it Back on the Ground. Unloads Leveraged Foot Immediately. | Strong Dislike Unwilling to Pick Up Other Foot or Cannot Even Get Foot with Leverage Device Placed on the Ground Due to Discomfort. |
| 0 (Neutral) Indifferent | Displays No Definite Comfort or Discomfort with the Position of the Leverage Device. Similar to the Base Line | |

| +1 | +2 | +3 |
|---|---|---|
| Mild Like Willing to Pick Up Foot. Not In a Hurry to Place it Back on the Ground. Unloads the Other Foot Similar or Slower then the Base Line. | Moderate Like More Willing to Pick Up Foot. Slow to Put Foot Down. Not Eager to Unload the Other Foot. Relaxes and May Elicit Some Licking & Chewing. | Strong Like Picks Up Foot Without Asking. Holds Foot Up After Letting Go. Does Not Unload Leveraged Foot. Lots of Licking & Chewing. |

After the grade is established for one sector position of the wedge 25, the wedge is repositioned to a diagonally opposite position, such as the heel position, or in the 6:00 o'clock position of the plate (sees FIG. 4). The testing steps of raising the laterally opposed non-tested foot are repeated and a grade is established. The next step is to reposition the wedge 25 in another sector, for example, the left toe quadrant, and repeat the testing steps described for the toe position. Following completion of the left toe quadrant wedge position the wedge 25 is moved to the diagonally opposite position, that is, the right rear quadrant. The tests are repeated until the leg pick up tests have been conducted for all sector positions of the wedge 25.

While the method of the diagnostic leverage testing preferably includes the step of picking up the laterally opposing foot in order to measure the pain/comfort response of the horse when the lame foot is wholly loaded, it is possible that in some cases diagnostic results can be obtained by simply observing the horse's reaction to raising varies sectors of the lame foot when that foot is on the ground, without lifting the laterally opposed foot from the ground.

When all of the wedge sector positions have been tested and the grades for each recorded the evaluation for both diagnosis and treatment options can be made. The results of the leverage testing can be used in conjunction with other diagnostic and imaging protocols to offer supporting information for a diagnosis that has already been made. It can also offer a direction for focusing specific imaging methods such as radiographs or MRI. The following table is a general reference guide for primary hoof and leg structures that are most likely being influenced by the leverage testing.

Table of Affected Structures

| Position of Wedge | Primary Structures Affected or Influenced |
|---|---|
| #1 (Heel) | Decreased Tension of Deep Digital Flexor Tendon Third Interosseus Muscle (Susp. Lig.) & Extensor Branches of Susp. Lig., Increased Tension of Dorsal Digital Extensor Tendon |
| #2 (Toe) | Increased Tension of Deep Digital Flexor Tendon Third Interosseus Muscle (Susp. Lig.) & Extensor Branches of Susp. Lig., Decreased Tension of Dorsal Digital Extensor Tendon Increased Tension on Impar Ligament Increased Tension on Collateral Sesamoidean Ligament |
| #3 (Lat. Qtr.) | Increased Tension of Medial Collateral Ligament of DIP & PIP Joint Decreased Tension of Lateral Collateral Ligament of DIP & PIP Joint Coffin Joint Surface (contact on lateral side) Increased Tension of Medial Collateral Sesamoidean Ligament |
| #4 (Med. Qtr.) | Increased Tension of Lateral Collateral Ligament of DIP & PIP Joint Decreased Tension of Medial Collateral Ligament of DIP & PIP Joint Coffin Joint Surface (contact on medial side) Increased Tension of Lateral Collateral Sesamoidean Ligament |
| #5 (Lat. Toe) | Increased Tension of Palmar Medial Collateral Ligament of DIP Joint Decreased Tension of Dorsal Lateral Collateral Ligament of DIP Joint Increased Tension of Medial Collateral Sesamoidean Ligament |
| #6 (Med. Heel) | Increased Tension of Dorsal Lateral Collateral Ligament of DIP Joint Decreased Tension of Palmar Medial Collateral Ligament of DIP Joint Decreased Tension of Medial Collateral Sesamoidean Ligament |
| #7 (Med. Toe) | Increased Tension of Palmar Lateral Collateral Ligament of DIP Joint Decreased Tension of Dorsal Medial Collateral Ligament of DIP Joint Increased Tension of Lateral Collateral Sesamoidean Ligament |
| #8 (Lat. Heel) | Increased Tension of Dorsal Medial Collateral Ligament of DIP Joint Decreased Tension of Palmar Lateral Collateral Ligament of DIP Joint Decreased Tension of Lateral Collateral Sesamoidean Ligament |

Although pinpointing the exact location of the pain is helpful in diagnosis, the real benefit to using the leverage testing method and the disclosed apparatus is that by rotating the wedge 25 to another position (and particularly opposite to the position where pain was indicated) can show relief and comfort in the horse's response, which is necessary when providing optimal and effective lameness treatment.

What is claimed is:

1. A method for diagnosing equine hoof and leg pathology comprising the steps of,
providing a flat plate removeably attached to a hoof to be diagnosed, the shape of said plate resembling a bottom surface of the horse's hoof and where a bottom surface of the plate defines at least four sectors radially extending from the center of the plate, corresponding to at least four sectors of the horse's hoof
providing a wedge having respective thin and thick ends and whose base is in contact with the bottom surface of the flat plate and where the thin end is pivotally connected to the center of the plate,
with the plate on the ground and the hoof to be diagnosed in a load bearing position, raising a first one of the sectors of the hoof by positioning the wedge beneath a first one of the sectors of the plate, where the thick end of the wedge is disposed under the perimeter of the hoof,
measuring the pain reaction, if any, exhibited by the horse.

2. The method of claim 1 and further including the steps of, with the plate on the ground and the hoof to be diagnosed in a load bearing position, raising a second one of the sectors of the hoof that is diagonally opposite to the first sector of the hoof by positioning the wedge beneath the second sector of the wedge, with the thick end of the wedge being disposed under the perimeter of the hoof, measuring the pain reaction, if any, exhibited by the horse.

3. The method of claim 1 and further including the steps of, while the hoof being diagnosed is weight bearing and being raised by the wedge, lifting from the ground the hoof that is laterally opposed to the hoof being diagnosed, measuring the pain reaction, if any, exhibited by the horse.

4. The method of claim 2 and further including the steps of, while the hoof being diagnosed is weight bearing and being raised by the wedge, lifting from the ground the hoof that is laterally opposed to the hoof being diagnosed, measuring the pain reaction, if any, exhibited by the horse.

5. A method for diagnosing equine hoof and leg pathology comprising the steps of,
establishing a baseline response level for the horse by lifting from the ground the hoof that is laterally opposed to the hoof to be diagnosed while the hoof to be diagnosed is weight bearing,
measuring the pain or relief reaction, if any, exhibited by the horse,
providing a flat plate removeably attached to a hoof to be diagnosed, the shape of said plate resembling a bottom surface of the horse's hoof and where a bottom surface of the plate defines at least four sectors radially extending from the center of the plate, corresponding to at least four sectors of the horse's hoof
providing a wedge having respective thin and thick ends and whose base is in contact with the bottom surface of the flat plate and where the thin end is pivotally connected to the center of the plate,
with the plate on the ground and the hoof to be diagnosed in a load bearing position, raising a first one of the sectors of the hoof by positioning the wedge beneath a first one of the sectors of the plate, where the thick end of the wedge is disposed under the perimeter of the hoof,
measuring the pain reaction, if any, exhibited by the horse.

6. The method of claim 5 and further including the steps of, with the plate on the ground and the hoof to be diagnosed in a load bearing position, raising a second one of the sectors of the hoof that is diagonally opposite to the first sector of the hoof by positioning the wedge beneath the second sector of the wedge, with the thick end of the wedge being disposed under the perimeter of the hoof, measuring the pain reaction, if any, exhibited by the horse.

7. The method of claim 5 and further including the steps of, sequentially repeating the steps comprising the raising and the measuring, for at least a second one of the sectors of the hoof that is diagonally opposite to the first sector of the hoof, a third one of the sectors of the hoof, and a fourth one of the sectors of the hoof that is diagonally opposite to the third sector of the hoof.

\* \* \* \* \*